United States Patent
Hellstrom et al.

(10) Patent No.: US 9,657,660 B2
(45) Date of Patent: May 23, 2017

(54) METHOD AND SYSTEM FOR SURGE CONTROL

(71) Applicant: Ford Global Technologies, LLC, Dearborn, MI (US)

(72) Inventors: John Erik Mikael Hellstrom, Ann Arbor, MI (US); Mario Anthony Santillo, Canton, MI (US); Baitao Xiao, Canton, MI (US); Hamid-Reza Ossareh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 14/853,354

(22) Filed: Sep. 14, 2015

(65) Prior Publication Data

US 2017/0074180 A1    Mar. 16, 2017

(51) Int. Cl.
   *F02D 41/00*     (2006.01)
   *F02B 37/16*     (2006.01)
   *F02D 41/24*     (2006.01)
   *F02D 41/26*     (2006.01)
   *F02M 35/10*     (2006.01)
   *F02M 35/104*     (2006.01)
   *F02B 39/16*     (2006.01)

(52) U.S. Cl.
CPC .......... *F02D 41/0007* (2013.01); *F02B 37/16* (2013.01); *F02B 39/16* (2013.01); *F02D 41/2406* (2013.01); *F02D 41/26* (2013.01); *F02M 35/104* (2013.01); *F02M 35/1038* (2013.01); *F02M 35/10157* (2013.01); *F02M 35/10222* (2013.01); *F02B 2037/162* (2013.01); *F02B 2039/162* (2013.01)

(58) Field of Classification Search
CPC .......... F02D 41/0007; F02M 35/10157; F02B 37/16; F02B 2017/162
USPC ....................................................... 701/103
See application file for complete search history.

(56) References Cited

U.S. PATENT DOCUMENTS

| | | | | |
|---|---|---|---|---|
| 5,816,047 | A | * 10/1998 | Zurlo | F02B 37/18 60/602 |
| 6,134,888 | A | * 10/2000 | Zimmer | F02B 37/16 60/600 |
| 7,177,756 | B2 | * 2/2007 | Moninger | F02D 41/222 701/114 |
| 7,596,953 | B2 | 10/2009 | Krok et al. | |

(Continued)

OTHER PUBLICATIONS

Hellström, Erik et al., "Characterizing and Detecting Surge and Co-Surge in Automotive Compressors," Preprints, 8th IFAC International Symposium on Advances in Automotive Control, Norrköping, Sweden, pp. 716-721, Jun. 19-23, 2016, 6 pages.

*Primary Examiner* — Mahmoud Gimie
(74) *Attorney, Agent, or Firm* — Julia Voutyras; McCoy Russell LLP

(57) ABSTRACT

Methods and systems are provided for improving surge detection and mitigation. In one example, a surge detection method may selectively filter an aggregate of temperature-adjusted manifold pressure and boost pressure in a frequency range indicative of surge to reduce the effect of non-minimum phase behavior of throttle inlet pressure on surge detection. In addition, the noise contribution of particular engine actuators on throttle inlet pressure in the selected frequency range may be accounted for, reducing the occurrence of false surge indications.

20 Claims, 6 Drawing Sheets

(56) References Cited

U.S. PATENT DOCUMENTS

| | | | |
|---|---|---|---|
| 8,001,778 B2 * | 8/2011 | Sun | F02B 37/16 123/568.11 |
| 8,272,215 B2 | 9/2012 | Shu et al. | |
| 8,322,145 B2 | 12/2012 | Snider et al. | |
| 8,516,815 B2 | 8/2013 | Shu et al. | |
| 2002/0184951 A1 | 12/2002 | Bonanni | |
| 2014/0219820 A1 | 8/2014 | Koki et al. | |
| 2015/0300281 A1 * | 10/2015 | Sivasubramanian | F02D 41/0027 701/104 |

* cited by examiner

METHOD AND SYSTEM FOR SURGE CONTROL

FIELD

The present description relates generally to methods and systems for controlling a vehicle engine to improve the detection and mitigation of compressor surge.

BACKGROUND/SUMMARY

A turbocharger may be used to increase the power output of an internal combustion engine. The turbocharger does so by pressurizing the intake air, thereby increasing the mass of air provided to each of the engine's combustion chambers during the intake stroke. The increased air mass supports combustion of a correspondingly greater amount of fuel delivered to each combustion chamber, which provides increased power relative to a naturally aspirated engine of similar displacement. In a motor vehicle, a turbocharged engine may provide increased fuel economy by maintaining a higher power-to-weight ratio than a naturally aspirated engine of similar output and recovering internal energy from the exhaust to drive the turbocharger compressor. In addition, the use of a turbocharger allows a given power output to be achieved with a smaller or downsized engine. As such, the combination of engine downsizing, turbocharging, and delivery of fuel via direct injection has yielded considerable improvements in part-load fuel economy for gasoline-fueled engines while maintaining or exceeding the power output of conventional naturally-aspirated engines.

A turbocharger compressor is, however, susceptible to surge. Surge occurs when a pressure ratio in the turbocharger compressor (viz., the ratio of the outlet pressure to the inlet pressure) is too great relative to the flow of air through the turbocharger compressor. Turbocharger compressor surge (TCS) is a dynamic instability mode that can generate air-flow and self-excited pressure oscillations of great amplitude in the air mass flow. Surge can lead to undesired noise and noise, vibration, and harshness (NVH) issues. In addition, surge can constrain the torque capability of the engine, and may even affect the durability of the compressor hardware. For example, surge can induce undesirable stresses in the turbocharger and the intake, including excessive torsional loading on the turbocharger shaft. Consequently, continued or excessive TCS may decrease the longevity of the turbocharger and/or the engine to which it is coupled.

Various attempts have been made to enable early detection of surge, so that it can be addressed in a timely manner. One example approach to expedite surge detection is shown by Shu et al. in U.S. Pat. No. 8,516,815. Therein, transient surge, triggered by transient torque conditions such as tip-outs, etc., is detected by processing (e.g., low pass filtering) a manifold pressure estimated by a pressure sensor and/or mass air flow estimated by a manifold air flow sensor over a range of frequencies. The processed output is compared to a threshold to enable a faster and more accurate detection of surge, thereby improving surge mitigation.

However, the inventors herein have recognized potential issues with such an approach. As one example, the signal processing does not take into account the thermodynamics of the pressure waves. As such, the thermodynamic and chemical conditions of the engine may affect the pressure and airflow outputs of the sensor, thereby distorting the surge detection results. Specifically, parameters such as absolute pressure, temperature, humidity, and composition of the charge (including the amount of recycled exhaust gas or EGR) may affect the processed output resulting in incorrect surge detection (e.g., surge going undetected, or false positive surge detection). On the other hand, it may be difficult, and computationally intensive, to calibrate each engine to compensate for the varying thermodynamic conditions. As a result, a surge line on a compressor map may be calibrated more conservatively to satisfy safe and robust operation among a fleet of vehicles. Further, based on operating conditions, there may be engine actuators that correlate with the surge frequency. For example, actuators such as an intake throttle or an EGR valve may excite the pressure response in the same frequency band as that of surge, making it difficult to distinguish their effect on engine pressure from that of surge. Further still, the surge detection responsive to pressure estimation may change with change in driver demand due to non-minimum phase (NMP) behavior. The NMP behavior of the pressure can be falsely tagged as surge during selected transients, such as during a tip-in.

In one example, some of the issues described above may be at least partly addressed by a method for detecting surge in a boosted engine, comprising: combining one or more of manifold pressure and manifold flow with throttle inlet pressure into an aggregate intake pressure; and adjusting an engine operating parameter responsive to compressor surge, the surge determined based on the aggregate intake pressure, and further based on intake temperature. In this way, compressor surge be identified earlier and more reliably, improving surge mitigation.

As one example, an aggregate intake pressure may be computed by combining at least two pressure and/or flow measurements before and after the intake throttle for the purpose of surge detection. In particular, the aggregate pressure is then filtered with a band-pass frequency corresponding to the surge frequency range. Alternatively, filtered (e.g., band-pass filtered or low-pass filtered) values of intake manifold pressure (MAP) or intake manifold airflow (MAF) may be combined with throttle inlet pressure (TIP) into the aggregate intake pressure. The cut-off (or pass band) of the filter is adjusted based on engine operating conditions, such as temperature, to account for the variation in a surge frequency band where surge oscillations may be expected. A surge intensity is then calculated from the aggregate intake pressure using classical wave theory, taking into account the intake manifold temperature (at the time of MAP measurement) and/or boost temperature (at the time of TIP measurement). For example, an amplitude of peak pressure oscillations is determined. If the surge intensity is higher than a surge threshold, it is further determined if there were any actuator events that may have affected the TIP response in the same frequency band as that of surge. If yes, the effect of the actuators on the TIP response is separated from that of surge, and the intensity is reassessed relative to the threshold. A surge mitigating action, such as the temporary opening of a compressor recirculation valve, is then triggered based on the actuator-corrected surge intensity being higher than the surge threshold.

The technical effect of correlating the intensity of intake manifold pressure waves with one or more other available engine parameters is that more accurate detection of surge is enabled, and faster surge mitigation is possible. In particular, by comparing a filtered output of a throttle inlet pressure sensor to a baseline that is adjusted based on the thermodynamic and chemical conditions of the engine, the NMP effect on a throttle inlet pressure signal is reduced, allowing the onset of surge to be detected more accurately. Noise contributions from actuators that generate a TIP response in the surge frequency band can also be reduced. Further, a more aggressive surge line can be calibrated on a compressor map.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
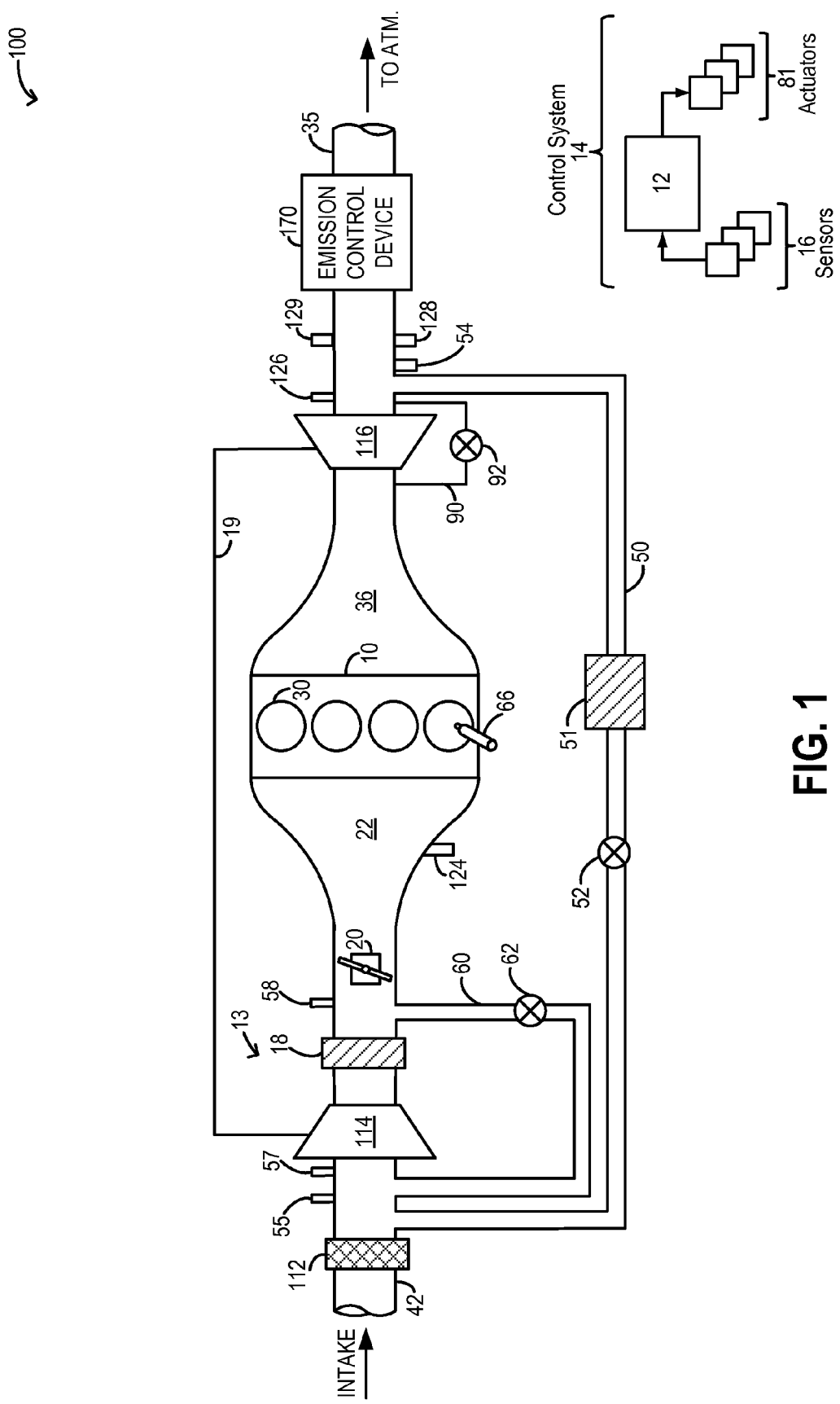
FIG. 1 shows an example boosted engine system configuration.

The following description relates to systems and methods for addressing surge in a boosted engine system, such as the system of FIG. 1. A controller may be configured to perform a control routine, such as the example routine of FIG. 2, to combine a plurality of pressures upstream and downstream of an intake throttle to determine an aggregate pressure, and determine surge intensity based on the aggregate pressure following correction for NMP pressure behavior and noise contribution of engine actuators. A block diagram of the surge intensity determination and assessment is shown at FIG. 3. Example processing of TIP and MAP for surge detection are described with reference to FIGS. 4-6. In this way, surge detection is improved, allowing for earlier mitigation.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124. In some embodiments, the intake manifold may further include a manifold air flow (MAF) sensor for estimating the flow of air charge into the intake manifold.

One or more sensors may be coupled to an inlet of compressor 114. For example, a temperature sensor 55 may be coupled to the inlet for estimating a compressor inlet temperature. As another example, a compressor inlet pressure sensor 57 may be coupled to the inlet for estimating a pressure of aircharge entering the compressor. Still other sensors may include, for example, air-fuel ratio sensors, humidity sensors, flow sensors, etc. In other examples, one or more of the compressor inlet conditions (such as humidity, pressure, temperature, etc.) may be inferred based on engine operating conditions.

Still other sensors may be coupled to the air intake system, upstream and downstream of the compressor, and upstream and downstream of intake throttle 20. For example, a throttle inlet pressure sensor 58 may be provided downstream of compressor 114 and upstream of throttle 20 for providing an estimate of the boost pressure being delivered to the engine.

During selected conditions, such as during a tip-out, when going from engine operation with boost to engine operation without boost, compressor surge can occur. This is due to a decreased flow through the compressor when the throttle closes at the tip-out. The reduced forward flow through the compressor can cause surge and degrade turbocharger performance. In addition, surge can lead to NVH issues such as undesirable noise from the engine intake system. To reduce compressor surge, at least a portion of the air charge compressed by compressor 114 may be recirculated to the compressor inlet. This allows excess boost pressure to be substantially immediately relieved and flow through the compressor to be increased. The result is a desirable drop in the pressure ratio across the compressor. The compressor recirculation system may include a recirculation passage 60 (herein also referred to as a compressor bypass) for recirculating compressed air from the compressor outlet, downstream of charge-air cooler 18 to the compressor inlet. In alternate examples, the compressor recirculation system may additionally or alternatively include a recirculation passage for recirculating compressed air from the compressor outlet, upstream of charge-air cooler to the compressor inlet. As such, the compressor recirculation flow delivered to the compressor inlet from downstream of CAC 18 may be a cooler recirculation flow (e.g., at a lower temperature) than a recirculation flow delivered from upstream of CAC 18.

Recirculation passage 60 may include a compressor recirculation valve (CRV) 62 (herein also referred to as a compressor bypass valve) for adjusting an amount of recirculation flow recirculated to the compressor inlet from downstream of the compressor. The recirculation valve 62 may be an on-off type single variable valve, in one example. Alternatively, CRV 62 may be a continuously variable valve wherein a position of the valve is continuously variable from a fully closed position to a fully open position and any position there-between. In some embodiments, CRV 62 may be normally partially open during boosted engine operation to provide some surge margin. Herein, the partially open position may be a default valve position. Then, in response to an indication of surge, the opening of the valve may be increased. For example, the valve may be shifted from the default, partially open position towards a fully open position via an actuator receiving signals from the engine controller 12. A degree of opening of the valve during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to improve boost response and peak performance. The valve may then be opened (e.g., partially opened or fully opened) in response to an indication of surge.

In addition to opening CRV 62, or in lieu of opening CRV 62, during a tip out, the surge margin may be improved via a wastegate actuator 92. Specifically, wastegate actuator 92 may be actuated to open based on a signal from engine controller 12 to dump at least some exhaust pressure from upstream of the turbine to a location downstream of the turbine via wastegate 90. By reducing exhaust pressure upstream of the turbine, turbine speed can be reduced.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted to the engine intake manifold to provide exhaust gas recirculation (EGR). Specifically, exhaust gas may be recirculated from the exhaust manifold to EGR passage 50, through EGR cooler 51 and EGR valve 52, to the inlet of compressor 114. The EGR valve may be actuated open based on a signal received from the engine controller 12 to admit a controlled amount of cooled exhaust gas to the compressor inlet for desirable combustion and emissions-control performance. In this way, engine system 10 is adapted to provide external, low-pressure (LP) EGR by recirculating exhaust gas from downstream of turbine 116 to a location upstream of compressor 114. The rotation of the compressor, in addition to the relatively long LP-EGR flow path in engine system 10, provides improved homogenization of the exhaust gas into the intake air charge. Further, the disposition of EGR take-off and mixing points provides effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor 54 may be provided for estimating an air-fuel ratio of the EGR. An opening of the EGR valve may be adjusted based on the engine operating conditions and the EGR conditions to provide a desired amount of engine dilution.

In the depicted embodiment, EGR passage 50 is shown as distinct from compressor recirculation passage 60. However, in alternate examples EGR passage 50 and compressor recirculation passage 60 may merge at a location upstream of the compressor inlet.

Figure 3:
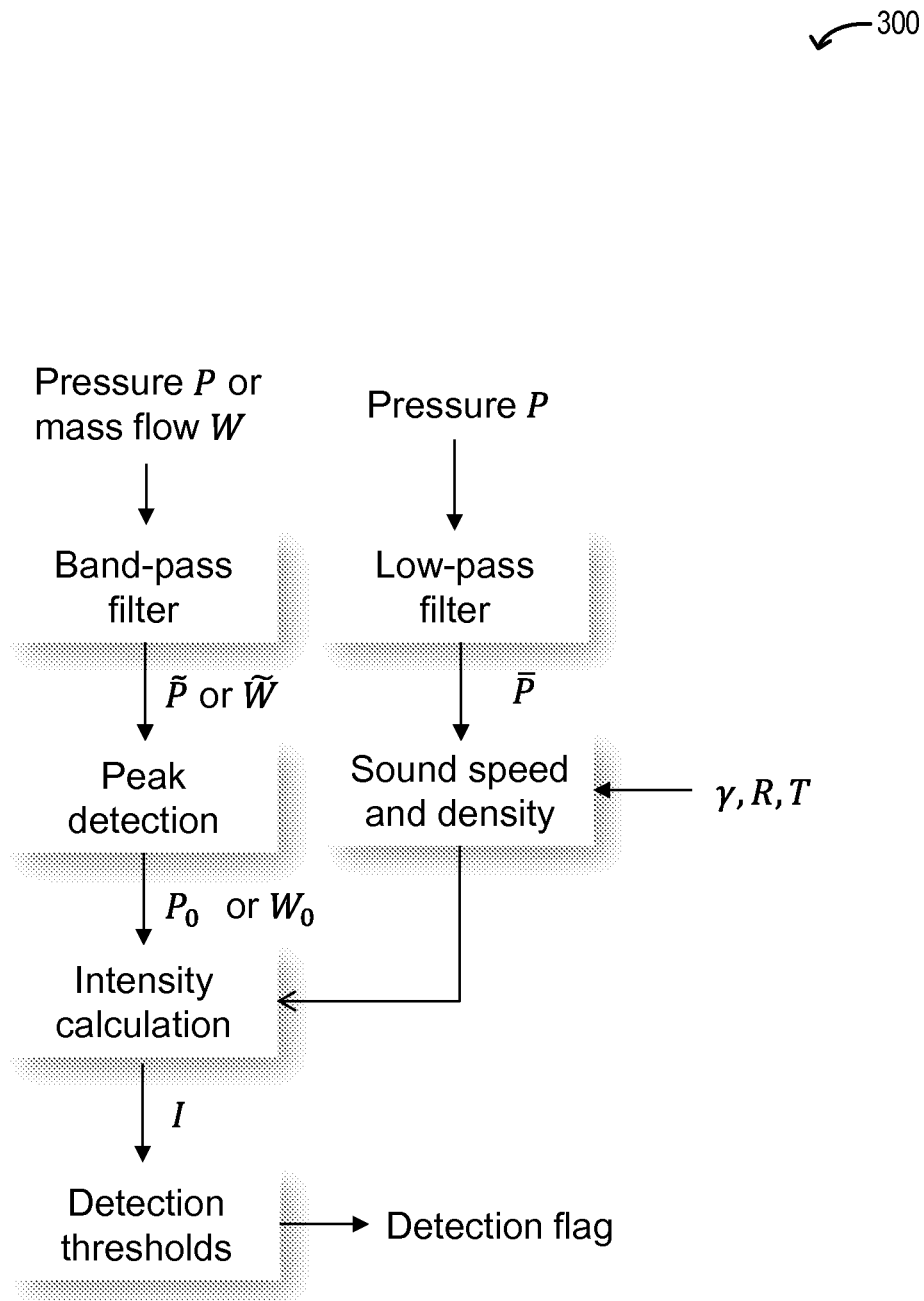
FIG. 3 shows an example block diagram of a surge intensity algorithm used for surge detection.
Figure 4:
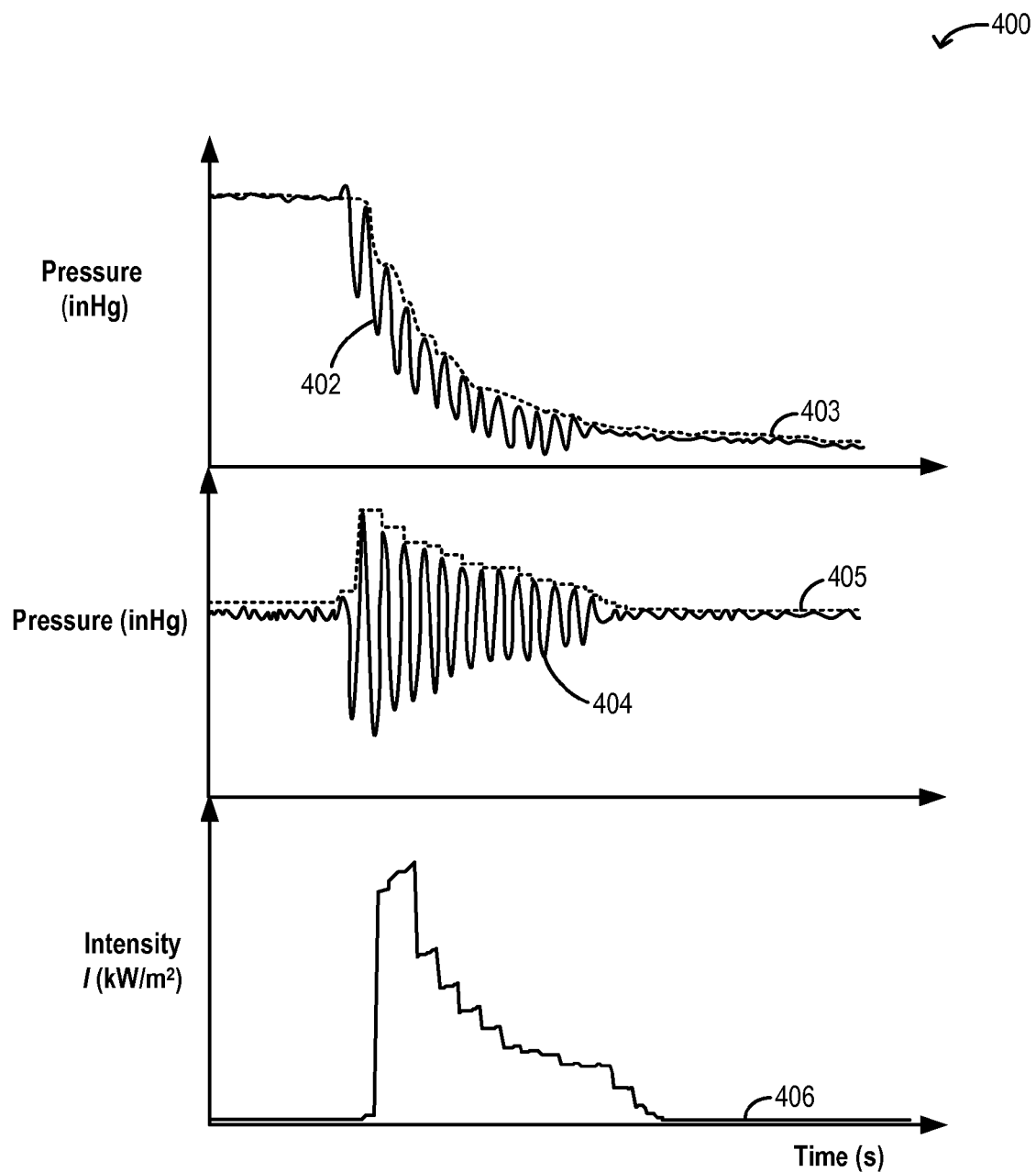
FIG. 4 shows an example processing of wave intensity during a surge event.
Figure 5:
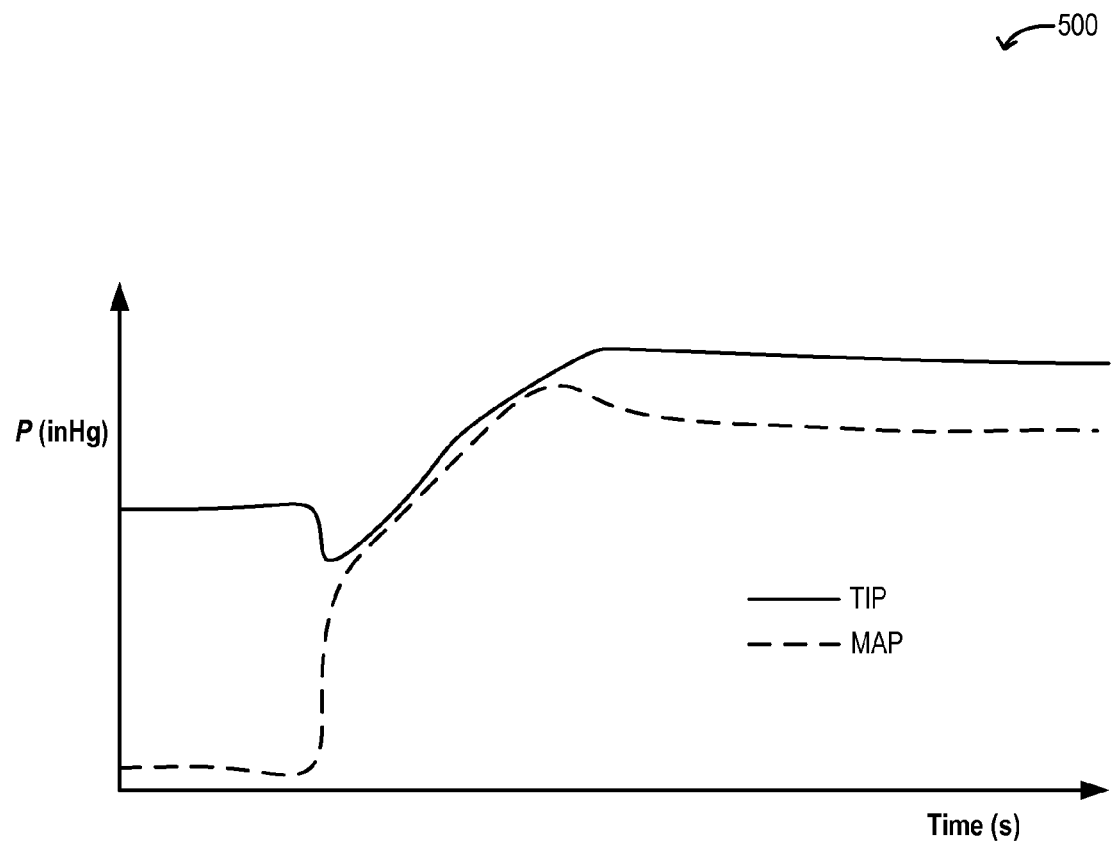
FIG. 5 shows an example of NMP behavior in TIP.

As elaborated herein at FIGS. 3-4, by combining pressure measurements from before and after the throttle (that is, TIP and MAP, respectively), to generate an aggregate intake pressure, surge intensity estimation can be improved. In particular, the NMP behavior of TIP can be better identified, reducing the false detection of surge due to the NMP behavior of TIP. In addition, the noise contribution of engine actuators, such as an EGR valve, that generate TIP responses in the same frequency range as surge, can be better removed. Overall, surge identification is rendered more accurate and reliable, allowing for early surge detection and mitigation.

Engine system 100 may further include control system 14. Control system 14 includes a controller 12 and is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 57, TIP sensor 58, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 62, wastegate actuator 92, and fuel injector 66. The control system 14 may include a controller 12. The controller may receive input data from the various sensors of FIG. 1, process the input data, and employ the various actuators of FIG. 1 to adjust engine operation based on the received signals and instructions stored on a memory of the controller. Example control routines are described herein with regard to FIGS. 2-3. For example, the controller may send a signal to an actuator of CRV 62 to actuate the valve to a more open position in response to an indication of surge.

Figure 2:
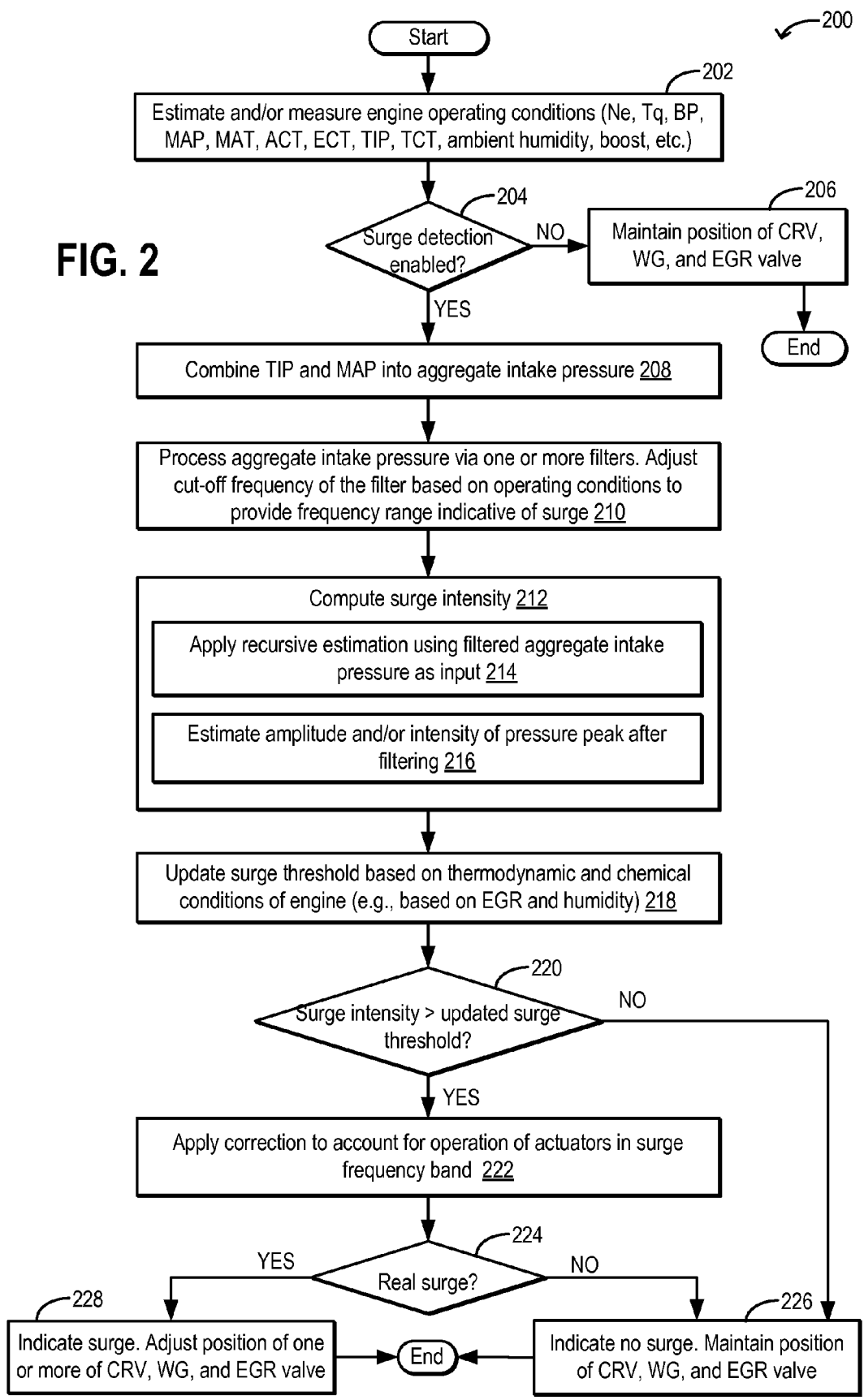
FIG. 2 shows a high-level flowchart of an example routine for detecting surge while reducing the noise contribution from actuators and NMP effects on pressure.

Now turning to FIG. 2, an example method 200 is shown for detecting compressor surge. The method relies on a physics-based metric that uses wave intensity to determine how powerful the surge oscillation are, allowing for early mitigation, or offline surge line calibration during the calibration stage. The oscillation amplitude is determined from pressure or mass flow measurements. The method improves the surge line calibration and adaptation, and also allows for easier online or offline detection of surge. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system, such as the sensors described above with reference to FIG. 1, to adjust engine operation, according to the methods described below.

At 202, the method includes estimating and/or measuring engine operating conditions such as engine speed, driver torque demand, ambient temperature, humidity, and pressure, barometric pressure, engine temperature, EGR, etc. Still other parameters may be determined, such as based on the output of corresponding sensors. These may include, for example, manifold pressure (MAP), manifold airflow (MAF), compressor inlet pressure (CIP), compressor inlet temperature (CIT), throttle inlet pressure (TIP) or boost pressure, throttle charge temperature (TCT), aircharge temperature (ACT), intake air temperature (IAT), etc.

At 204, it may be determined if surge detection is enabled. In the present example, surge detection may be enabled during a wide range of operating conditions including during tip-in events and tip-out events of a driver pedal. In other words, surge may be assessed based on pressure (and/or airflow) metrics during both an increase in torque demand following depression of a driver accelerator pedal, and a decrease in torque demand following release of the driver accelerator pedal.

If surge detection is not enabled, such as during steady-state conditions, then at 206, the method includes maintaining the position of one or more engine actuators such as a compressor recirculation valve (CRV) coupled in a bypass across the compressor, an exhaust wastegate actuator, and an EGR valve. The method then ends and exits.

If surge detection is enabled, then at 208, the method includes combining throttle inlet pressure (TIP) and manifold air pressure (MAP) into an aggregate intake pressure. In other words, two pressure measurements from before and after the throttle are combined for the purpose of surge detection. Combining throttle inlet pressure (TIP) and manifold air pressure (MAP) into an aggregate intake pressure may include combining a weighted value of throttle inlet pressure (TIP) with a weighted value of manifold air pressure (MAP) into the aggregate intake pressure. The weighting may be based on the corresponding temperatures of the combined charges. For example, the weightage of MAP may be based on manifold air charge temperature while the weightage of TIP may be based on throttle charge temperature (or boost temperature). In an alternate example, the controller may combine MAP and TIP into the aggregate intake pressure and then adjust the aggregate pressure based on temperature, specifically, based on each of a weighted air charge temperature and a weighted boost temperature. It will be appreciated that in alternate examples, estimated manifold airflow (MAF) may be combined with throttle inlet pressure (or flow) to determine an aggregate intake pressure or aggregate intake airflow, the surge detection them based on the flow-based aggregate intake pressure or the aggregate intake airflow.

The inventors herein have recognized that relying only on throttle inlet pressure (or only on MAP) for surge detection works well for some engine configurations but not others. For example, the approach may provide more accurate results in an in-line engine relative to a V-engine. This difficulty arises from the non-minimum phase (NMP) response of TIP to changes in driver demand. NMP behavior, which is common in complex systems, typically arises when two competing processes at different timescales act on a given measurement. In the engine air path system, NMP behavior arises for the following reason: during a tip-in event, the throttle opens, which causes TIP to initially drop and manifold pressure (MAP) to suddenly rise. The increase in MAP causes engine flow and hence the turbocharger power to increase, which leads to an increase in TIP. Consequently, as shown in map 500 of FIG. 5, TIP (represented by a solid line) initially drops fast and then slowly rises while MAP (represented by a dashed line) rises gradually. The initial drop in TIP is indicative of the NMP behavior. In terms of the physics of the process, it is caused by the competing dynamics of manifold filling (fast dynamics) and turbocharger spool-up (slow dynamics). A similar situation arises during a tip-out event. When the driver tips-out, TIP initially rises, and then falls, indicating the NMP behavior.

The inventors have realized that the NMP behavior of TIP may contain energy in the surge frequency (e.g., around 8 Hz) depending on the boost pressure and intake volume of the engine (such as in the case of a 3.5 L V6 engine). In such a system, a surge detection method that relies on the signal processing of TIP may falsely flag the NMP behavior as surge. As elaborated herein with reference to FIG. 6, the approach may correctly identify surge on tip-outs. However, the NMP behavior on a tip-in may be falsely flagged as surge.

To remedy this issue, the present method reduces the NMP effect from the signal by combining TIP and MAP (or MAF) into an aggregate intake pressure. Specifically, the aggregate intake pressure is determined as a weighted sum of measured TIP and MAP (or MAF).

To define the aggregate intake pressure, the pressure in the combined boost and intake volumes are defined as:

$$m_T = m_i + m_b$$

$$V_T = V_i + V_b$$

$$T_T = \frac{m_i}{m_i + m_b} T_i + \frac{m_b}{m_i + m_b} T_b$$

where m denotes mass, V denotes volume and T denotes temperature. Subscript i denotes the intake, subscript b denotes boost, and subscript T denotes the aggregate values. These equations indicate that the volume of a hypothetical aggregate plenum is the sum of the two volumes, the mass of gas in the new volume is the total mass of gasses, and the new temperature is given by a weighted average of temperatures assuming adiabatic mixing.

Using the ideal gas law (PV=mRT), the new aggregate intake pressure, $P_T$, can be shown to be given by:

$$P_T = P_b \frac{V_b}{V_i + V_b} + P_i \frac{V_i}{V_i + V_b}$$

This aggregate pressure indicates the pressure that would be obtained if both intake and boost volumes were combined and the gasses were brought to the temperature $T_T$. By running the surge detection algorithm of the present routine on the aggregate intake pressure, the non-minimum phase behavior can be significantly reduced during both tip-ins and tip-out. Furthermore, wrong flaggings of tip-ins as surge can be reduced. In other words, by detecting surge using the aggregate intake pressure $P_T$ and temperature $T_T$ values, instead of only the temperature and pressure upstream of the throttle, surge detection can be improved.

It will be appreciated that in the usage of the ideal gas law above, R is assumed to be constant. However, it may fact be variable and depend on, for example, humidity and EGR (such as EGR percentage, dilution, or flow). Therefore, in alternate examples, the equation for determination of the aggregate intake pressure $P_T$ may be modified accordingly to take these into account.

Figure 6:
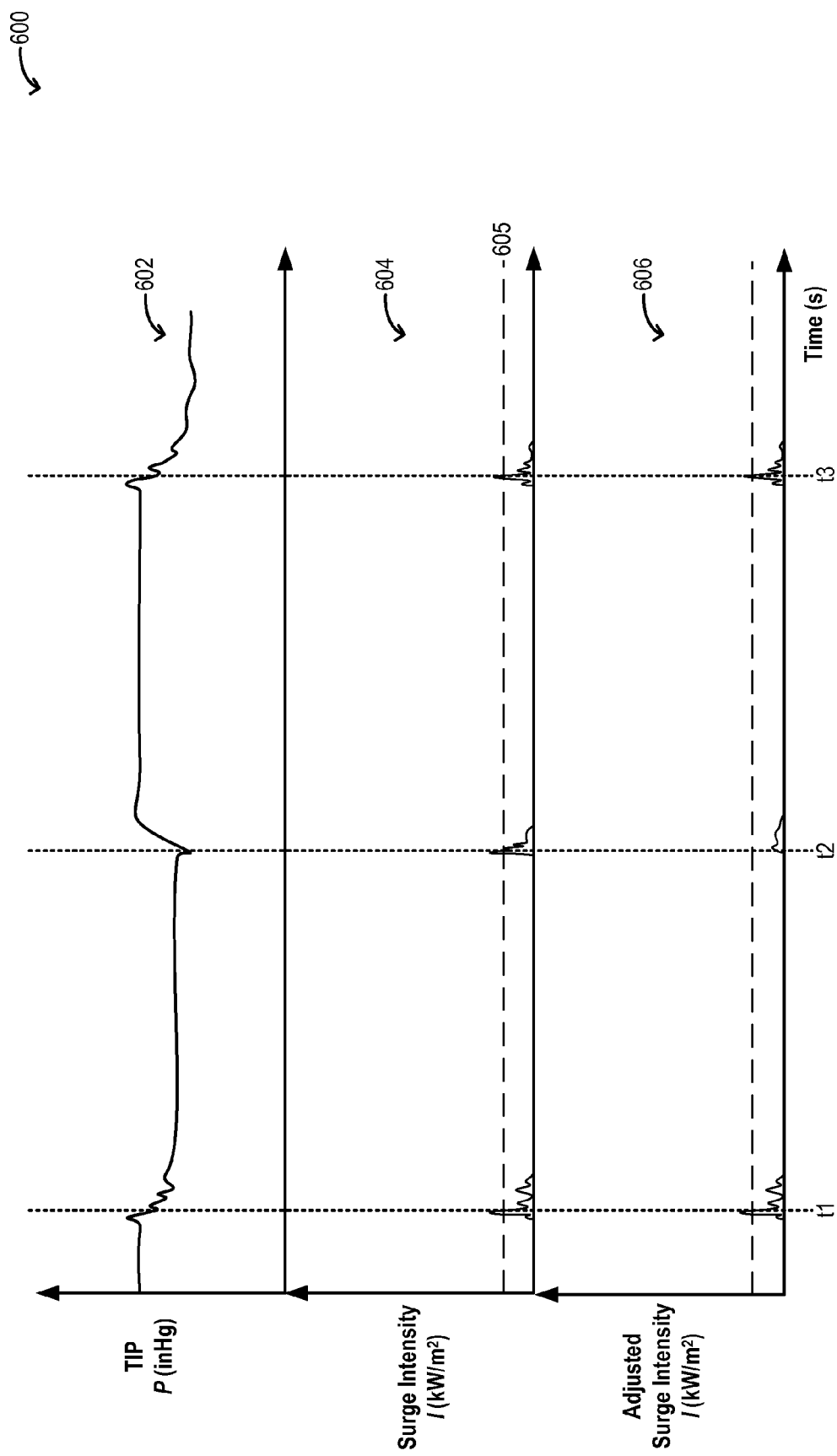
FIG. 6 shows an example of adjusted surge intensity after taking into account the NMP behavior in TIP during tip-in and tip-out events.

An example of the reduction in false surge flagging by taking into the account the NMP behavior is shown with reference to map 600 of FIG. 6. Plot 602 depicts TIP, plot 604 depicts a surge intensity calculated using only TIP, while plot 606 depicts an adjusted surge intensity that is calculated using TIP as well as MAP and intake temperature to take into account the NMP behavior. The surge intensities are compared to surge threshold 605. The map depicts two tip-out events at t1 and t3 and a single tip-in event at t2.

In plot 604, when the unadjusted surge intensity is compared to the surge threshold, surge on the tip-out events is correctly identified. However, the NMP behavior of TIP during the tip-in event is falsely flagged as surge. In comparison, in plot 606, when the adjusted surge intensity is compared to the surge threshold, surge on the tip-out events is correctly identified and the NMP behavior of TIP during the tip-in event is not flagged as surge. In other words, surge is identified more reliably.

Returning to FIG. 2, at 210 the method includes processing the aggregate intake pressure via one or more filters. The one or more filters may be, for example, a low-pass filter and a band-pass filter. Further, a passing range (or cut-off frequency, or pass-band) of the one or more filters may be adjusted based on engine operating conditions. That is, the filter may be configured to pass selected frequencies (of the aggregate intake pressure) that are indicative of surge while reducing the passing (or blocking) of frequencies (of the aggregate intake pressure) that are outside of the surge range. The selected frequencies that are passed through the filter include a range of frequencies that are variable, and change with engine operating conditions such as temperature. The temperature for adjusting the cut-off frequency may include one or more of an intake manifold air charge temperature and a compressor inlet temperature. Further, the temperature for adjusting the cut-off frequency may include a weighted average of the intake manifold air charge temperature and the compressor inlet temperature.

It will be appreciated that in some examples, during a tip-in event, the output of the filter may be ignored including at the frequencies indicative of surge to reduce the likelihood of false surge flagging.

At 212, the method includes computing a surge intensity. The computed surge intensity is then used for surge detection. Computing the surge intensity includes, at 214, applying a recursive estimation using the filtered aggregate intake pressure as the input. This approach is based on system identification where a model of the system is adaptively identified online and no a priori information about the system is required. The obtained model of the pressure signal is used for detecting surge and can also be used for predicting future values of pressure.

Computing the surge intensity may additionally or alternatively include, at 216, estimating an amplitude and/or intensity of peak pressure oscillations of the aggregated intake pressure after passing through the filter(s). This approach is based on the wave intensity of the pressure oscillations, and is elaborated below. The surge intensity as determined in this approach captures the energy transported by the pressure wave (the potential surge wave) and therefore directly measures how powerful the surge is. The approach takes into account the thermodynamics of the pressure waves, including the thermodynamic and chemical conditions. Basing the surge detection on surge intensity makes the method applicable to different types of engines and simplifies calibration.

As such, to quantify compressor surge, an expression for the power transmitted by the pressure oscillations is derived using classical wave theory. Consider, for example, a one-dimensional compression wave, such as in the intake path of an engine. The wave causes a displacement of the air molecules represented as ξ(x,t) where x is the coordinate and t is time. A mass element between position x and x+δx is thus displaced by ξ(x,t) and stretched by δξ. The resulting volume change is δV=Aδξ where A is the cross-section area. The mass of the element is δm=ρA δx, wherein ρ is the density. Assuming small displacements (such as where δξ/δx<<1), ideal gas, and that the process is isentropic (where PVϒ, is constant), the pressure variation δP becomes:

$$\delta P = -\gamma \bar{P} \frac{\partial \xi}{\partial x} \tag{1}$$

where ϒ, is the specific heat ratio for the gas and P is the average pressure. The tension is F(x)=−AδP and the net force on the mass element is ∂F/∂x δx. Newton's second law for the mass element then yields the wave equation:

$$\frac{\partial^2 \xi}{\partial t^2} = \frac{1}{c^2} \frac{\partial^2 \xi}{\partial x^2} \tag{2}$$

Where $$c = \sqrt{\frac{\gamma \bar{P}}{\rho}} \tag{3}$$

is the wave speed (speed of sound). The power transmitted by the wave is finally given by equation (4) as per:

$$\mathcal{P} = -F(x)\frac{\partial \xi}{\partial t} = -\gamma A \overline{P}\frac{\partial \xi}{\partial t}\frac{\partial \xi}{\partial x} \quad (4)$$

It has been observed that the pressure oscillations during compressor surge are contained within a narrow frequency band. The observations motivated studying one harmonic wave, which is described by equation (5):

$$\xi(x,t) = \xi_0 \sin(k(x-ct)) \quad (5)$$

where $\xi_0$ is the amplitude and k is the wave number. For this harmonic, the pressure variation (1) has the amplitude:

$$P_0 = \gamma \xi_0 k \overline{P} = \rho \xi_0 c^2 k \quad (6)$$

and by Eq. (4), the average power is:

$$\langle \mathcal{P} \rangle = \left\langle \frac{A}{\rho c}P_0^2 \cos^2(k(x-ct)) \right\rangle = \frac{A}{2\rho c}P_0^2$$

The intensity I of the wave, defined as the transmitted power per unit area is then:

$$I = \frac{\langle \mathcal{P} \rangle}{A} = \frac{1}{2\rho c}P_0^2$$

An alternative intensity expression based on mass flow is derived here by noting that the mass flow variation is $$\delta W = \rho \frac{\partial V}{\partial t} = \rho A \frac{\partial \xi}{\partial t}.$$

For the harmonic (5), the flow amplitude is thus:

$$W_0 = \rho \xi_0 A c k \quad (7)$$

And, by comparing (6) and (7), the intensity is:

$$I = \frac{1}{2\rho c}P_0^2 = \frac{c}{2\rho A^2}W_0^2. \quad (8)$$

In summary, if the speed of sound c and the density p are known, the intensity of a harmonic compression wave can be calculated from Eq. (8) based on data for the oscillation amplitude of either pressure or mass flow.

An algorithm for calculation (e.g., online or offline, on-board or off-board) of the intensity of compressor surge, based on Eq. (8), is thus formulated in the following, and is described at FIG. 3. As elaborated herein with reference to FIG. 3, by using MAP and TIP, and the above-described equations, the surge intensity of a surge compression wave may be determined and used for reliable surge detection. As such, a block diagram 300 for the surge intensity algorithm is shown at FIG. 3. The equations and parameters associated with each block of block diagram 300, and as discussed above (such as equations (1) through (8) and parameters described above and below, such as P, W, c, $\rho$, $\gamma$, , R, T, I, A, $f_1$, $f_2$, $\tilde{Y}$ and $\overline{P}$, etc.) are indicated in parentheses.

The pressure during surge is thus approximated as one (single) harmonic:

$$P = \overline{P} - P_0 \cos(k(x-ct))$$

with amplitude $P_0$ around an average pressure $\overline{P}$. The aim is to calculate the intensity for oscillations in the frequency band where surge occurs.

The oscillation amplitude, $P_0$ or $W_0$, is computed through band-pass filtering and a peak detection logic. The cut-off frequencies for the filter, $(f_1, f_2)$, are chosen so that $f_1 < 1/T_0 < f_2$, where $1/T_0$ is the observed surge frequency in the particular engine configuration used (e.g., based on the number of cylinders in the engine, whether the engine is in-line, or V, etc.). The filter output $\tilde{Y}$ is fed to a peak detection logic that computes the maximum and minimum amplitude over a moving window of length $T_w$, takes the minimum of these values at each samples, and applies a low-pass filter with time constant $\tau$ for smoothing. The logic is designed to detect peaks while attenuating asymmetric signals, such as non-oscillating engine dynamics in the pass-band $(f_1, f_2)$. The window length is chosen such that $T_w \geq T_0$.

The speed of sound, c, from Eq. (3), and the density, $\rho$ from the ideal gas law, $$\rho = \frac{\overline{P}}{RT} \quad (9)$$

Are calculated from measured or estimated thermodynamic conditions and properties. For example, for air, $\gamma \approx 1.4$ and $R \approx 287$ J/kgK. The average pressure $\overline{P}$ is obtained by low-pass filtering with cut-off frequency $f_0 < f_1$.

The intensity is calculated from Eq. (8). If using mass flow amplitude, the area A can be calculated from the pipe diameter. For surge detection, the intensity is fed through detection logic with hysteresis using thresholds (L, U).

While block diagram 300 of FIG. 3 depicts the algorithm, an illustration of the surge algorithm with data is given in map 400 of FIG. 4. The inputs for the algorithm are measured or estimated pressure P, temperature T, gas properties ($\gamma$, , R), and optionally mass flow W for determining $W_0$. The parameters ($f_0$, $f_1$, $f_2$, $T_w$, $\tau$, L, U) and, if using mass flow measurements, A.

From Eq. (8), it becomes clear that a threshold on the intensity for surge detection is equivalent to a scaled threshold for squared amplitude of pressure or mass flow where the scaling is done using the thermodynamic conditions as captured by the density p and speed of sound c. The scaling can be significant considering that, for example, the density downstream of the compressor in an automotive engine varies by more than a factor of two during normal operation. The use of surge intensity therefore provides a way, advantageously leveraging the physics involved, to simplify threshold selection and adaptation for varying operating conditions and engine configurations.

It will be appreciated that in alternate examples, mass air flow estimation, such as via mass air flow sensors, may be used for the surge detection. This may provide various advantages since MAF does not contain the NMP behavior that is seen in the TIP response. Thus, as elaborated earlier with reference to FIG. 3, the left branch of the surge detection routine may start with pressure P or flow W. As such, a pressure estimation may still be required for the right branch of the surge detection routine so as to dynamically scale the surge threshold.

Returning to FIG. 2, at 218, the method includes updating a surge threshold of the engine based on thermodynamic and chemical conditions of the engine. In particular, the surge threshold is adjusted to account for changes in the absolute pressure, temperature, and composition of the gas. For example, the surge threshold is adjusted based EGR (such as an amount of EGR, a flow of EGR, or a percentage of EGR). The surge threshold may additionally be adjusted based on ambient humidity.

At 220, the method includes comparing the computed surge intensity to the updated surge threshold. If the surge intensity is not higher than the threshold, the routine moves to 226 where it is indicated that there is no surge. In addition, responsive to the indication of no surge, the position of one or more engine actuators is maintained. For example, the position of the EGR valve, the CRV, and the wastegate is maintained.

If the surge intensity is higher than the threshold, then at 222, before confirming surge, the method includes applying a correction to account for the operation of actuators that generate a response in the surge frequency band. In particular, the method includes, in response to operation of an engine actuator in the selected frequencies indicative of surge, further processing the filtered aggregate intake pressure based on a change in throttle inlet pressure resulting from the operation of the engine actuator. The engine actuator may be one or more of an intake throttle, an exhaust gas recirculation valve, a compressor recirculation valve, and a driver accelerator pedal.

The surge detection method of the current disclosure focuses on the frequency range most-consistent with surge. However, the inventors have recognized that other disturbances may be present in that same frequency band. These may corrupt the results of the surge detection method and may require extra attention to enable robust surge detection. For example, the closed-loop combination of throttle and exhaust-gas recirculation (EGR) can excite the TIP response in the same frequency band as that of surge. To address this, the surge detection method is updated to take into account engine control parameters so that their effect on the TIP response can be separated from that of surge. Example actuators that can correlate with the surge frequency include the throttle, the EGR valve, a compressor recirculation valve (CRV), and driver pedal movements. Although the wastegate actuator can also excite the TIP response, the bandwidth for the wastegate response is much lower than typical surge frequencies. As a result, the wastegate actuator may not be considered as a noise factor for surge detection. Additional (non-actuator) factors that can affect the closed-loop system in the selected surge frequency range may include poor engine calibration causing instabilities and numerical instabilities involved with non-linear look-up tables and jumping. Specifically, non-linear look-up tables involving parameters such as engine speed, engine load, and intake and exhaust cam positions can jump from index to index within the same frequency band as surge, affecting the TIP response through fluctuations in engine mass airflow.

When the wave intensity calculation based on TIP measurements suggests surge is occurring (at 220), the correction at 222 first removes the effect of any actuators that can stimulate the TIP response in that same frequency range. In doing so, robustness for surge detection is increased, enabling faster recovery from surge events as well as enabling a more aggressive calibration of the surge line on the compressor map.

To remove the effect of actuators that can correlate with the surge frequency, a virtual pressure value (or sensor) may be used within the surge-detection algorithm. For example, in the case of throttle and EGR flow, the pressure signal p is given by $$p = m \frac{RT}{V}$$

where m, V, and T represent mass, volume, and temperature, respectively, and R is the universal gas constant. The mass is a combination of compressor $m_c$, throttle $m_{thr}$, and EGR $m_{egr}$. Defining a virtual pressure sensor or pressure value $$\bar{p} = p - \frac{RT}{V}(m_{thr} + m_{egr})$$

that can be calculated from measured and/or estimated values available in the engine controller, the throttle and EGR effects can be removed. Specifically, since $m = m_c + m_{thr} + m_{egr}$, we have $$\bar{p} = \frac{RT}{V} m_c$$

which only involves the mass quantity associated with the compressor. Other actuators that correlate with the surge frequency (CRV, etc.) can be dealt with similarly.

To remove the effect of non-actuator factors that can correlate with the surge frequency, a frequency at which sensitive non-linear engine controller look-up tables jump from index to index are monitored and compared to the frequency-range of interest for surge detection. If the two frequencies overlap, the surge-detection threshold level can be increased temporarily to reduce false detection of a surge event.

An example depiction of the processing of the pressure signals for surge intensity estimation and subsequent surge detection is shown with reference to map 400 of FIG. 4. The top plot depicts a TIP (P) measured during a tip-out event at curve 402 (solid line). A nominal pressure (such as a low-pass filtered pressure) $\bar{P}$ based on the measured TIP is shown alongside at curve 403 (dashed line). The second plot depicts a band-pass filtered value of the pressure at curve 404 (solid line). An amplitude of the filtered pressure ($P_0$) is shown alongside at curve 405 (dashed line). The bottom plot depicts the intensity of the associated pressure wave (the "surge intensity") at curve 406.

At 224, the method includes confirming of a real surge event has occurred. In particular, the surge intensity is re-compared to the surge threshold after the effects of the interfering actuators (such as EGR valve and throttle) are removed. If after the removal of the effect of the interfering actuators, the surge intensity is not higher than the threshold, then at 226, it is indicated that there is no surge. In addition, responsive to the indication of no surge, the position of one or more engine actuators is maintained. For example, the position of the EGR valve, the CRV, and the wastegate is maintained.

If after the removal of the effect of the interfering actuators, the surge intensity is higher than the threshold, then at 228, it is indicated that there is a real surge occurrence. In addition, the method includes adjusting an operator parameter of the engine responsive to the indication of compressor surge, the surge determined herein based on the aggregate intake pressure and intake temperature. For example, the position of one or more engine actuators is adjusted to adjust the operating parameter. For example, the position of the EGR valve, the CRV, and the wastegate is adjusted. As an example, an opening of the CRV is increased by an actuator based on signals received from the controller. As another example, an opening of the wastegate is increased by an actuator based on signals received from the controller. As yet another example, an opening of the EGR valve is increased by an actuator based on signals received from the controller.

It will be appreciated that while the method herein shows surge detection based on the processing of measured air pressure signals (such as MAP and TIP), it will be appreciated that in alternate examples, the surge detection may be based on measured airflow signals, such as MAF.

As a result of the surge detection approach of FIG. 2, surge intensity can be seen to clearly rise when the pressure signal indicates surge oscillations, improving the correlation with the surge. In addition, the surge intensity may be greater than zero during tip-in events even when there is no visible surge. The detection relies on the filter (e.g., band-pass filter) to separate out the relevant signal, which will be affected if there is energy in the specified pass-band from no-surging engine dynamics. By using a threshold on the intensity for surge detection, however, the non-surging events may be correctly classified and distinguished from surge events. In addition, surge thresholds may be calibrated more aggressively (that is, the thresholds may be lowered). The low thresholds allow the controller to detect a brief surge oscillation during a tip-out while avoiding false detections during a tip-in.

In this way, wave intensity is used for characterizing compressor surge in boosted engines, the surge characterizable for both online and offline operation. By using an intensity metric that captures the power transmitted by pressure oscillations, and using classical wave theory to characterize the oscillations, surge can be detected faster and more reliably. The early detection of surge allows for early mitigation of surge, reducing engine durability and drivability issues arising from surge. The technical effect of correlating the intensity of pressure waves with other available engine parameters is that a surge line can be calibrated more aggressively on a compressor map. In addition, in comparison to surge detection approaches that rely on static compressor maps, which have to be tuned conservatively to be robust, the current approach based on an aggregated pressure that is filtered in the surge range allows for surge detection thresholds to be automatically adjusted to the operating conditions. This enables a less conservative mitigation action to be used for addressing surge and a resulting higher utilization of the compressor.

One example method for a boosted engine comprises: combining manifold pressure and throttle inlet pressure into an aggregate intake pressure; and adjusting an operating parameter responsive to compressor surge, the surge determined based on a the aggregate intake pressure, and intake temperature. In another example, the preceding example method may additionally or optionally further comprise processing the aggregate intake pressure via a filter. In any or all of the preceding examples, the filter may additionally or optionally pass selected frequencies indicative of surge and reduce the passing of frequencies outside of surge. In any or all of the preceding examples, the selected frequencies that are passed through the filter may additionally or optionally include a range of frequencies that change with engine operating conditions including temperature. In any or all of the preceding examples, the temperature may additionally or optionally include one or more of an intake manifold air charge temperature and a compressor inlet temperature. In any or all of the preceding examples, the temperature may additionally or optionally include a weighted average of an intake manifold air charge temperature and a compressor inlet temperature. In any or all of the preceding examples, the filter may additionally or optionally include one or more of a low-pass filter and a band-pass filter, and a passing range of the filter may be additionally or optionally adjusted based on engine operating conditions. In any or all of the preceding examples, the method may additionally or optionally further comprise, during a tip-in event, ignoring an output of the filter including at the frequencies indicative of surge. In any or all of the preceding examples, the method may additionally or optionally further comprise, in response to operation of an engine actuator in the selected frequencies indicative of surge, further processing the filtered aggregate intake pressure based a change in throttle inlet pressure resulting from the operation of the engine actuator. In any or all of the preceding examples, the engine actuator may additionally or optionally include one or more of an intake throttle, an exhaust gas recirculation valve, a compressor recirculation valve, and a driver accelerator pedal. In any or all of the preceding examples, the compressor surge is additionally or optionally determined on one or more of a tip-in event and a tip-out event of a driver accelerator pedal. In any or all of the preceding examples, the adjusting an operating parameter additionally or optionally includes adjusting via an actuator, the actuator including one or more of an exhaust wastegate actuator and a compressor recirculation valve.

Another example method for a boosted engine comprises: combining manifold pressure and throttle inlet pressure into an aggregate pressure; adjusting the aggregate pressure based on temperature; processing the adjusted aggregate pressure through one or more filters; and indicating compressor surge based on a processed output. In the preceding example, the adjusting based on temperature may additionally or optionally include adjusting based on each of a weighted air charge temperature and a weighted boost temperature, the method additionally or optionally further comprising, in response to the indication, increasing an opening of a compressor recirculation valve to increase recirculation of compressed air from downstream of a compressor to upstream of the compressor. In any or all of the preceding examples, the combining additionally or optionally includes combining during driver pedal tip-in and tip-out events. In any or all of the preceding examples, the processing additionally or optionally includes low-pass or band-pass filtering the adjusted aggregate pressure and estimating one or more of an amplitude and an intensity of the processed output, and indicating compressor surge based on the processed output additionally or optionally includes indicating compressor surge based on the amplitude or the intensity of the processed output being higher than a surge threshold, the threshold based on one or more of EGR and ambient humidity. In any or all of the preceding examples, the method additionally or optionally further comprises, updating the processed output responsive to actuation of one or more of an EGR valve, an intake throttle, an exhaust wastegate, and a compressor bypass valve, the updating based on an effect of the actuation on the throttle inlet pressure in a frequency range indicative of surge.

Another example engine system comprises: an engine intake manifold including an intake throttle; a compressor for providing a boosted aircharge to the intake manifold; a compressor bypass including a compressor recirculation valve for diverting compressed air from downstream of the compressor to upstream of the compressor; a first pressure sensor coupled downstream of the throttle for estimating manifold pressure; a first temperature sensor coupled downstream of the throttle for estimating manifold aircharge temperature; a second pressure sensor coupled upstream of the throttle for estimating throttle inlet pressure; a second temperature sensor coupled upstream of the throttle for estimating boost temperature; an EGR valve in an EGR passage for recirculating exhaust gas to the intake manifold; and a controller. The controller is configured with computer-readable instructions stored on non-transitory memory for: combining the manifold pressure and the throttle inlet pressure into an aggregate intake pressure; filtering the aggregate intake pressure to select pressure signals in a selected frequency range indicative of surge; comparing a peak intensity of the filtered aggregate intake pressure with a threshold to indicate compressor surge, the threshold adjusted based on actuation of the EGR valve in the selected frequency range; and in response to the indication of compressor surge, increasing an opening of the compressor recirculation valve. In the preceding example system, the controller additionally or optionally includes further instructions for adjusting the selected frequency range based on a weighted average of the manifold aircharge temperature and the boost temperature. In any or all of the preceding examples, the engine system additionally or optionally further comprises a driver pedal, and wherein the combining, filtering, and comparing is additionally or optionally performed during both driver pedal tip-in and tip-out events.

In a further representation, an example method for a boosted engine comprises: band-pass filtering a throttle inlet pressure value; estimating an amplitude or intensity of a peak pressure of the band-pass filtered throttle inlet pressure; and indicating compressor surge responsive to the estimated amplitude/intensity relative to a threshold. The preceding example method may additionally or optionally further comprise correcting the estimated amplitude or intensity based on MAP. Any or all of the preceding examples may additionally or optionally further comprise correcting the estimated amplitude or intensity based on correlation with actuation of an intake throttle and/or an EGR valve. In any or all of the preceding examples, the threshold may be additionally or optionally adjusted based on one or more of EGR, and humidity.

In another further representation, an example method for a boosted engine may comprise: combining manifold airflow and throttle inlet airflow (or pressure) into an aggregate intake airflow; and adjusting an operating parameter responsive to compressor surge, the surge determined based on the aggregate intake airflow, and further based on intake temperature. In another example, the preceding example method may additionally or optionally further comprise processing the aggregate intake airflow via a filter to pass frequencies indicative of surge and not pass frequencies outside of the expected surge range.

In yet another further representation, an example method for a boosted engine may comprise: combining measured manifold airflow and measured throttle inlet airflow into an aggregate airflow estimate; adjusting the aggregate airflow estimate based on temperature; processing the adjusted aggregate airflow estimate through one or more filters; and indicating compressor surge based on a processed output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
combining one or more of manifold airflow and manifold pressure with throttle inlet pressure into an aggregate intake pressure; and
adjusting an operating parameter responsive to compressor surge, the surge determined based on the aggregate intake pressure, and further based on intake temperature.

2. The method of claim 1, further comprising, processing the aggregate intake pressure via a filter.

3. The method of claim 2, wherein the filter passes selected frequencies indicative of surge and disables the passing of frequencies outside of surge.

4. The method of claim 3, wherein the selected frequencies that are passed through the filter include a range of frequencies that change with engine operating conditions including temperature.

5. The method of claim 4, wherein the temperature includes one or more of an intake manifold air charge temperature and a compressor inlet temperature.

6. The method of claim 4, wherein the temperature includes a weighted average of an intake manifold air charge temperature and a compressor inlet temperature.

7. The method of claim 2, wherein the filter includes one or more of a low-pass filter and a band-pass filter, and wherein a passing range of the filter is adjusted based on engine operating conditions.

8. The method of claim 3, further comprising, during a tip-in event, ignoring an output of the filter including at the frequencies indicative of surge.

9. The method of claim 3, further comprising, in response to operation of an engine actuator in the selected frequencies indicative of surge, further processing the filtered aggregate intake pressure based a change in throttle inlet pressure resulting from the operation of the engine actuator.

10. The method of claim 9, wherein the engine actuator includes one or more of an intake throttle, an exhaust gas recirculation valve, a compressor recirculation valve, and a driver accelerator pedal.

11. The method of claim 1, wherein the compressor surge is determined on one or more of a tip-in event and a tip-out event of a driver accelerator pedal.

12. The method of claim 1, wherein the adjusting an operating parameter includes adjusting via an actuator, the actuator including one or more of an exhaust wastegate actuator and a compressor recirculation valve.

13. A method for a boosted engine, comprising:
combining manifold pressure and throttle inlet pressure into an aggregate pressure;
adjusting the aggregate pressure based on temperature;
processing the adjusted aggregate pressure through one or more filters; and
indicating compressor surge based on a processed output.

14. The method of claim 13, wherein the adjusting based on temperature includes adjusting based on each of a weighted air charge temperature and a weighted boost temperature, the method further comprising, in response to the indication, increasing an opening of a compressor recirculation valve to increase recirculation of compressed air from downstream of a compressor to upstream of the compressor.

15. The method of claim 13, wherein the combining includes combining during driver pedal tip-in and tip-out events.

16. The method of claim 13, wherein the processing includes low-pass or band-pass filtering the adjusted aggregate pressure and estimating one or more of an amplitude and an intensity of the processed output, and wherein indicating compressor surge based on the processed output includes indicating compressor surge based on the amplitude or the intensity of the processed output being higher than a surge threshold, the threshold based on one or more of EGR and ambient humidity.

17. The method of claim 13, further comprising, updating the processed output responsive to actuation of one or more of an EGR valve, an intake throttle, an exhaust wastegate, and a compressor bypass valve, the updating based on an effect of the actuation on the throttle inlet pressure in a frequency range indicative of surge.

18. An engine system, comprising:
an engine intake manifold including an intake throttle;
a compressor for providing a boosted aircharge to the intake manifold;
a compressor bypass including a compressor recirculation valve for diverting compressed air from downstream of the compressor to upstream of the compressor;
a first pressure sensor coupled downstream of the throttle for estimating manifold pressure;
a first temperature sensor coupled downstream of the throttle for estimating manifold aircharge temperature;
a second pressure sensor coupled upstream of the throttle for estimating throttle inlet pressure;
a second temperature sensor coupled upstream of the throttle for estimating boost temperature;
an EGR valve in an EGR passage for recirculating exhaust gas to the intake manifold; and
a controller with computer-readable instructions stored on non-transitory memory for:
combining the manifold pressure and the throttle inlet pressure into an aggregate intake pressure;
filtering the aggregate intake pressure to select pressure signals in a selected frequency range indicative of surge;
comparing a peak intensity of the filtered aggregate intake pressure with a threshold to indicate compressor surge, the threshold adjusted based on actuation of the EGR valve in the selected frequency range; and
in response to the indication of compressor surge, increasing an opening of the compressor recirculation valve.

19. The system of claim 18, wherein the controller includes further instructions for adjusting the selected frequency range based on a weighted average of the manifold aircharge temperature and the boost temperature.

20. The system of claim 18, further comprising a driver pedal, wherein the combining, filtering, and comparing is performed during both driver pedal tip-in and tip-out events.

\* \* \* \* \*